United States Patent
Cho et al.

(10) Patent No.: US 8,219,396 B2
(45) Date of Patent: Jul. 10, 2012

(54) APPARATUS AND METHOD FOR EVALUATING PERFORMANCE OF SPEECH RECOGNITION

(75) Inventors: Hoon-Young Cho, Daejeon (KR); Yunkeun Lee, Daejeon (KR); Ho-Young Jung, Daejeon (KR); Byung Ok Kang, Daejeon (KR); Jeom Ja Kang, Daejeon (KR); Kap Kee Kim, Daejeon (KR); Sung Joo Lee, Daejeon (KR); Hoon Chung, Daejeon (KR); Jeon Gue Park, Daejeon (KR); Hyung-Bae Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 845 days.

(21) Appl. No.: 12/336,208

(22) Filed: Dec. 16, 2008

(65) Prior Publication Data
US 2009/0157399 A1    Jun. 18, 2009

(30) Foreign Application Priority Data
Dec. 18, 2007 (KR) .................. 10-2007-0133217

(51) Int. Cl.
*G10L 15/00* (2006.01)
(52) U.S. Cl. ........................................ 704/231
(58) Field of Classification Search .................. 704/231
See application file for complete search history.

(56) References Cited

U.S. PATENT DOCUMENTS

| | | | |
|---|---|---|---|
| 6,404,925 B1 * | 6/2002 | Foote et al. .................. 382/224 |
| 7,359,856 B2 * | 4/2008 | Martin et al. ................. 704/226 |
| 7,454,340 B2 | 11/2008 | Sakai et al. |
| 2007/0143105 A1 * | 6/2007 | Braho et al. .................. 704/231 |
| 2007/0198269 A1 | 8/2007 | Braho et al. |

* cited by examiner

*Primary Examiner* — Susan McFadden

(57) ABSTRACT

An apparatus for evaluating the performance of speech recognition includes a speech database for storing N-number of test speech signals for evaluation. A speech recognizer is located in an actual environment and executes the speech recognition of the test speech signals reproduced using a loud speaker from the speech database in the actual environment to produce speech recognition results. A performance evaluation module evaluates the performance of the speech recognition by comparing correct recognition results answers with the speech recognition results.

9 Claims, 3 Drawing Sheets

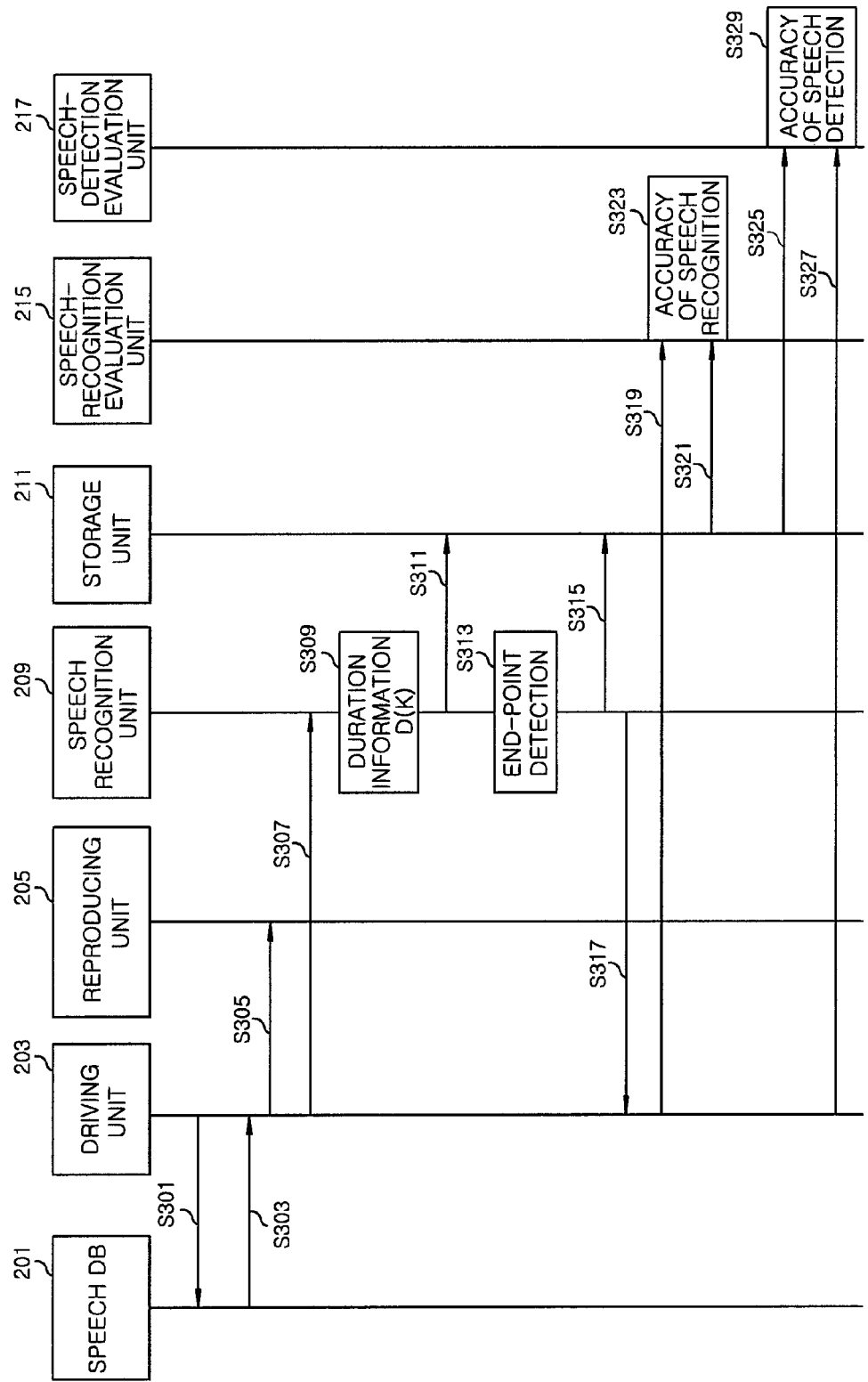

APPARATUS AND METHOD FOR EVALUATING PERFORMANCE OF SPEECH RECOGNITION

CROSS-REFERENCE(S) TO RELATED APPLICATION

The present invention claims priority of Korean Patent Application No. 10-2007-0133217, filed on Dec. 18, 2007, which is incorporated herein by reference.

FIELD OF THE INVENTION

The present invention relates to a speech recognition technology, and more particularly, to an apparatus and method for automatically evaluating the performance of speech recognition in noise environments, without human utterance or intervention.

This work was supported by the IT R&D program of MIC/IITA [2006-S-036-02, Development of large vocabulary/interactive distributed/embedded VUI for new growth engine].

BACKGROUND OF THE INVENTION

As well-known, the speech recognition technology has high recognition performance of 95% or more word recognition rate (accuracy) with respect to tens of thousands of words only when speech recognition is performed in a relatively quiet environment.

However, since there are various noises in the actual environments where the speech recognition technology is used, the accuracy rapidly decreases as the performance of speech recognition lowers. For the practical use of the speech recognition technology, it needs to have high accuracy even in any noise environments.

To improve the recognition performance of a speech recognizer in noise environments, it is necessary to evaluate the recognition performance in the noise environments where the speech recognizer is actually used, analyze the factors lowering the recognition performance, improve the recognition method allowing for noises, and develop the suitable noise reducing/removing technology based on the result of analysis.

It is very important to accurately evaluate the performance of the speech recognizer in the various noise environments to improve the performance of the speech recognizer.

According to a conventional method for evaluating the performance of a speech recognizer, a person collects data of speech uttered through a microphone, builds speech DB (database) for evaluation by using the uttered speech data and off-line operates the speech recognizer to evaluate the performance of the speech recognition. That is, in the conventional method, a person directly utters parts or all of the words registered in the speech recognizer in the noise environments where the speech recognizer is actually used, generates utterance files for evaluation by recording the uttered words, and constitutes a final evaluation set where a correct answer text is provided for each utterance file.

The evaluation set is expressed by the following Equation 1.

$$T = \{(t_1, y_1), (t_2, y_2), \ldots, (t_N, y_N)\} \quad \text{[Equation 1]}$$

where $t_i$ and $y_i$ are the $i^{th}$ utterance file for evaluation and a correct answer text thereof (for example, word, word sequence, or sentence), respectively.

The conventional method is performed by passing the $i^{th}$ utterance file $t_i$ through the speech recognizer to obtain an output text $o_i$ of a recognition result and comparing the output text $o_i$ with the correct answer text $y_i$ with respect to all i to calculate the accuracy, thereby evaluating the performance of the speech recognizer.

However, in the conventional method, the uttered speech DB for evaluation needs to be built every time the speech recognizer is exposed in different noise environments, for example, inside a moving car, an exhibit hall, or the like. To this end, a number of people need to directly utter whenever the speech signal are required to be collected for evaluation.

Moreover, when a person directly utters, the volume of the uttered speech signal is not accurately controlled. Since noise characteristics change a lot even in a specific noise environment with the passage of time, for example, in an exhibit hall, it is impossible to collect the speech signal for evaluation on all of these noise conditions.

SUMMARY OF THE INVENTION

It is, therefore, an object of the present invention to provide an apparatus and method for evaluating the performance of speech recognition, without any needs for a person to directly utter or record for test speech data.

Another object of the present invention is to provide an apparatus and method capable of automatically evaluating the performance of speech recognition in any noise environments, without human intervention.

In accordance with an aspect of the present invention, there is provided an apparatus for evaluating the performance of speech recognition including:

an speech database for storing audio signal files of N-number of test speech signals for evaluation;

a driving unit for reproducing the respective audio signals of the test speech signals, the driving unit having the correct recognition results of the test speech signals;

a speech recognizer for executing a speech recognition of the reproduced audio signals in an actual environment where the speech recognizer is located to produce speech recognition results; and a performance evaluation module for evaluating the performance of the speech recognition by comparing the correct recognition results with the speech recognition results.

In accordance with another aspect of the present invention, there is provided a method for evaluating the performance of speech recognition, including:

storing audio signal files of N-number of test speech signals for evaluation;

reproducing the respective audio signals of the uttered speech through a speaker;

performing the speech recognition of the respective reproduced audio signals to produce speech recognition results; and evaluating the performance of the speech recognition by comparing correct recognition results of the speech signals with the speech recognition results.

BRIEF DESCRIPTION OF THE DRAWINGS

The above and other objects and features of the present invention will become apparent from the following description of embodiments given in conjunction with the accompanying drawings, in which:

FIG. 3 is a flow chart of a method for evaluating the performance of speech recognition in accordance with embodiment of the present invention.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
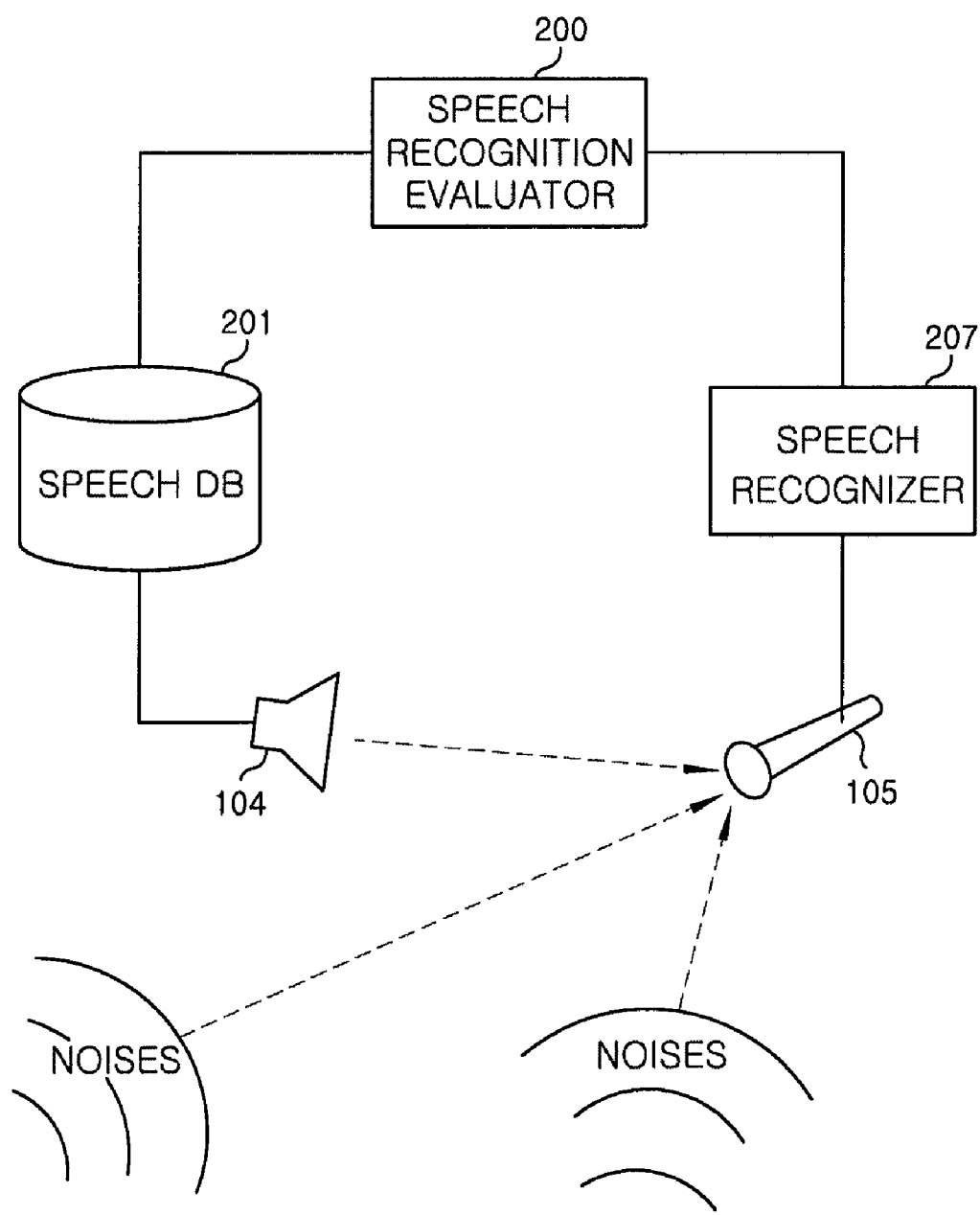
FIG. 1 shows a schematic block diagram illustrating a basic principle of an apparatus for evaluating the performance of speech recognition in accordance with an embodiment of the present invention.

FIG. 1 shows a schematic block diagram illustrating a basic principle of an apparatus for evaluating the performance of speech recognition in accordance with an embodiment of the present invention. As shown in FIG. 1, the apparatus includes a speech DB 201, a speech recognition evaluator 200 and a speech recognizer 207.

The speech DB 201 stores audio signal files of N-number test speech signals X(1), X(2), . . . , X(N) for evaluation and duration information D(1), D(2), . . . , D(N) of the respective test speech signals. The speech recognition evaluator 200 controls the speech DB 201 to reproduce the audio signal files of the speech signals through a loud speaker 104. A microphone 105 receives the reproduced audio signals with noises added thereto existing in an actual environment where the speech recognizer 207 is positioned. The speech recognizer 207 executes to recognize the audio signals with the noises which are input through the microphone 105.

The speech recognition evaluator 200 evaluates the performance of the speech recognition performed by the speech recognizer 207.

Figure 2:
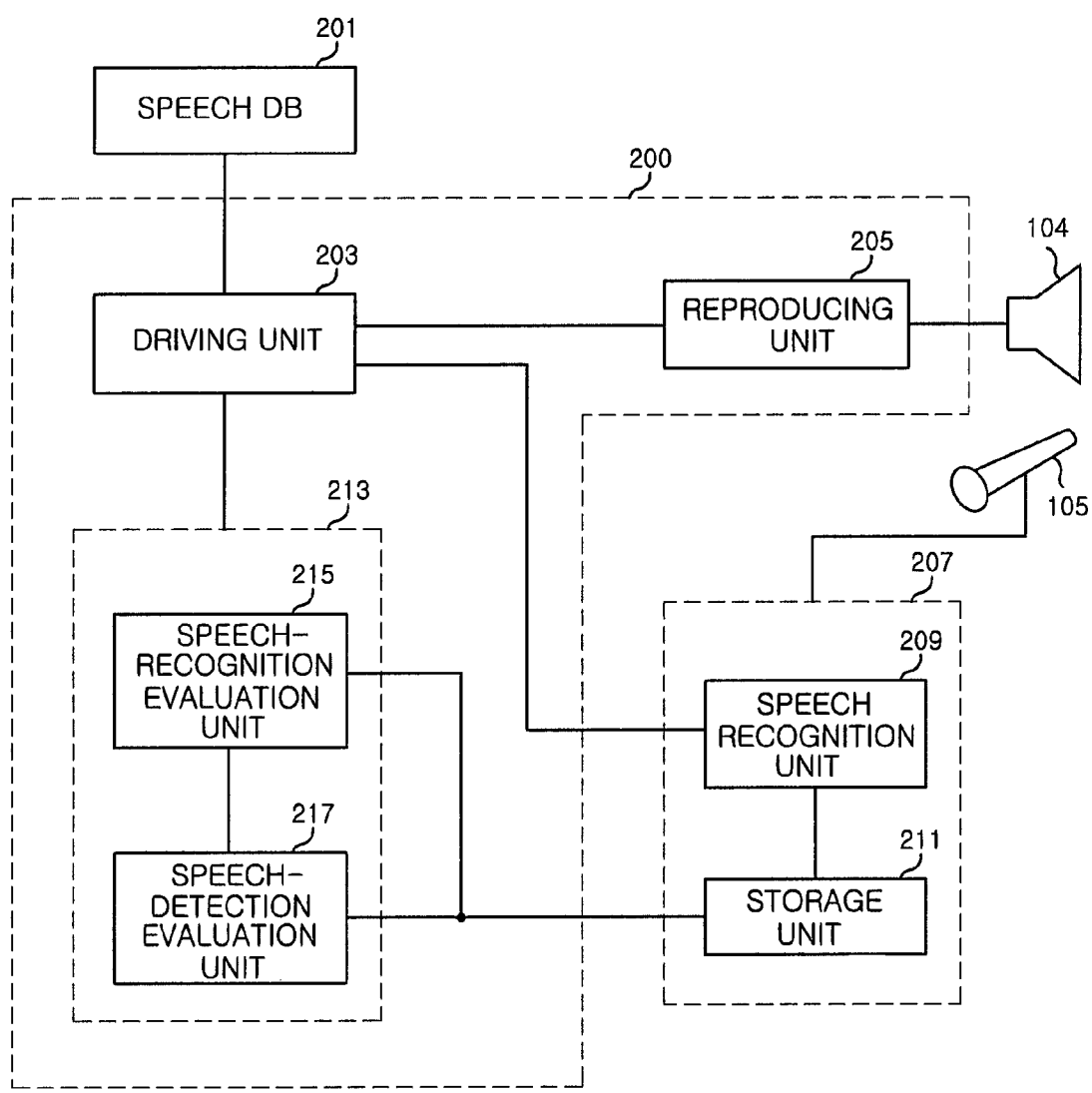
FIG. 2 is a detailed block diagram of the apparatus for evaluating the performance of speech recognition shown in FIG. 1.

FIG. 2 is a detailed block diagram of the apparatus shown in FIG. 1.

As shown in FIG. 2, the speech recognition evaluator 200 includes a driving unit 203, a reproducing unit 205, and a performance evaluation module 213.

The driving unit 203 sequentially requests an audio signal file of the $k_{th}$ speech signal X(k) stored in the speech DB 201, and controls a reproducing unit 205 to reproduce the audio signal file of the $k_{th}$ speech signal X(k) through the speaker 104. The driving unit 203 has a list of correct recognition results for the speech signals X(1), X(2), . . . , X(N), which will be provided to the performance evaluation module 213. Further, the driving unit 203 transmits a start instruction to start the speech recognition along with duration information D(k) of the speech signal X(k) to the speech recognizer 207.

Although it has been shown and described that the reproducing unit 205 is separated from the driving unit 203, it will be appreciated to those skilled in the art that the driving unit 203 may incorporate the reproducing unit therein so that it may reproduce the audio signals provided from the speech DB 201.

The speech recognizer 207 includes a speech recognition unit 209 and a storage unit 211. The speech recognition unit 209 performs a speech recognition on the $k_{th}$ speech signal X(k) after being reproduced from the reproducing unit 205 and the storage unit 211 stores speech recognition results of the $k_{th}$ speech signal X(k) and an speech section Z(k) of a speech signal which is detected and used for the speech recognition.

Upon receiving the start instruction, the speech recognition unit 209 detects a speech section of the reproduced acoustic signal of the $k_{th}$ speech signal X(k) using the duration information D(k) and executes the speech recognition of the detected speech section Z(k), which is actually used for the speech recognition. For example, if D(k) is 3 seconds, upon receiving the start instruction the speech recognition unit 209 begins recording the signal reproduced by a speaker, and stops after 3 seconds, resulting in the detected speech section Z(k).

Alternatively, the detection of the speech section may be made by using the function of end-point detection (hereinafter, referred to as "EPD"), without using the duration information. This EPD function is well known in the art to detect a speech section of the reproduced acoustic signal of the $k_{th}$ speech signal X(k) from the start-point to the end-point. Accordingly, the speech recognition unit 209 may detect a speech section of the reproduced acoustic signal of $k_{th}$ speech signal X(k) using the EPD function, not the duration information D(k), and execute the speech recognition of the detected speech section Z(k), which is actually used for the speech recognition.

The performance of such speech section detection has a great influence on the result of the speech recognition executed by the speech recognizer 207. Therefore, it is necessary to analyze whether the deterioration in the recognition performance is caused by the error of the speech detection or by the speech recognition algorithm itself when evaluating the accuracy of the speech recognition in the noise environments.

Therefore, according to the present invention, the performance of the speech recognition is evaluated by distinguishing the case where the speech recognizer 207 employs the duration information from the case where the speech recognizer 207 employs the EPD function.

On the other hand, the performance evaluation module 213 includes a speech-recognition evaluation unit 215 and a speech-detection evaluation unit 217.

The speech-recognition evaluation unit 215 receives the correct recognition results of the N-utterances through the driving unit 203 and the speech recognition results from the speech recognizer 207. The speech-recognition evaluation unit 215 compares the respective correct recognition results with the respective speech recognition results to calculate the accuracy of the speech recognition, which may be represented as a percentage (%). The accuracy of the speech recognition indicates the performance of the speech recognizer 207.

The speech-detection evaluation unit 217 receives the speech signals X(1), X(2), . . . , X(N) from the driving unit 203 and the detected speech section Z(1), Z(2), . . . , Z(N) from the speech recognizer 207. The speech detection evaluation unit 217 obtains cross-correlation coefficients between the respective speech signals and the respective speech sections of the real speech signals.

Assuming that X(k)=$x_1, x_2, \ldots x_t, \ldots x_{T1}$, and Z(k)=$z_1, z_2, \ldots z_t, \ldots z_{T2}$, the cross-correlation coefficient, R($\tau$), of the two signals X(k) and Z(k) is calculated as follows:

$$R(\tau) = \frac{1}{L}\sum_{i=1}^{L} x_i z_{i+\tau}, \text{ where } L = \min\{T1, T2\} - \tau \quad \text{[Equation 2]}$$

where $x_i$ is an $i_{th}$ sample of an original speech signal X(k), $z_i$ is an $i_{th}$ sample of a detected speech section Z(k), T1 is the number of samples in X(k), T2 is the number of samples in Z(k), and $\tau$ represents a lag value and has values $\tau$=0, 1, . . . . As the value of $\tau$ increases starting from 0, R($\tau$) shows the largest value when the two signals overlaps (or coincides) the most.

The maximum of cross-correlation coefficients $R(\tau)$ is then compared with a preset threshold to yield the performance of the speech detection which is indicated as a percentage (%).

More specifically, the maximum of cross correlation coefficients $R(\tau)$ has a very high value if the detected speech signal $Z(k)$ overlaps the speech signal $X(k)$. Otherwise, the maximum of cross-correlation coefficients $R(\tau)$ has relatively low values. When the maximum of cross-correlation coefficients $R(\tau)$ is lower than the predetermined threshold, it is determined that there exists an error in the speech detection. However, when the maximum of cross-correlation coefficients $R(\tau)$ is higher than the predetermined threshold value, the speech detection is determined as being well performed. Therefore, a rate of the number of the well performed speech detection to the N-number of speech signals is calculated as a percentage (%) to indicate the final performance of the speech detection.

Although it has been described herein that the EPD function is represented by the calculation of the cross-correlation coefficients using the above Equation and the comparison of the maximum cross-correlation coefficient with the preset threshold, it should be noted that the present invention does not intend to limit the EPD function to the above and any of solutions known in the art may be applied to the EPD function.

A process of evaluating the performance of speech recognition, using the apparatus for evaluating the performance of the speech recognition having the above-described constitution, will be described.

FIG. 3 is a flow chart of a method for evaluating the performance of speech recognition according to embodiment of the present invention.

In step S301, the driving unit 203 requests the speech DB 201 to transmit the $k_{th}$ test speech signal $X(k)$ for evaluation. In step S303, in response to the request, the speech DB 201 then transmits the audio files of the $k_{th}$ test speech signal $X(k)$ and the duration information $D(k)$ thereof to the driving unit 203.

In step S305, the driving unit 203 provides the audio files of the $k_{th}$ test speech signal $X(k)$ along with a predetermined volume information $V(k)$ to the reproducing unit 205. Simultaneously, in step S307, the driving unit 203 transmits the duration information $D(k)$ of the $k_{th}$ test speech signal $X(k)$ and the start instruction of the speech recognition to the speech recognizer 207.

The reproducing unit 205 immediately reproduces the $k_{th}$ test speech signal $X(k)$ through the speaker 104 so that the $k_{th}$ test speech signal $X(k)$ is produced in an actual environment where the speech recognizer 207 is positioned. Then, a noise signal $N(k)$ existing in the actual environment is added to the reproduced audio file of the $k_{th}$ test speech signal $X(k)$ to produce a noisy speech signal $Y(k)$. The noise-speech signal $Y(k)$ is collected through the microphone 105 and then provided to the speech recognizer 207.

Subsequently, in step S309, upon receiving the start instruction and the duration information $D(k)$ of the $k_{th}$ test speech signal $X(k)$, the speech recognition unit 209 performs the speech recognition of the noisy speech signal $Y(k)$ using the duration information $D(k)$, to produce the speech recognition result.

In step S311, the speech recognition result is then stored along with the speech section $Z(k)$ of the noisy speech $Y(k)$ in the storage unit 211.

In the above case, the speech recognition has been made by using the duration information $D(k)$ of the $k_{th}$ test speech signal $X(k)$.

On the other hand, as in step S313, if it is needed to evaluate the performance of the speech recognition using the EPD function, unlike the case of using duration information $D(k)$, upon receiving the start instruction of the recognition, the speech recognition unit 209 performs the speech recognition on the noisy speech signal $Y(k)$ using the speech detection of EPD function to produce the speech recognition result. In step S315, the speech recognition result is then stored in the storage unit 211 along with the signal of speech section $Z(k)$ detected by using the EPD function.

After the completion of the speech recognition of the audio signal file of the $k_{th}$ test speech signal $X(k)$, the speech recognizer 207, in step S317, transfers a speech recognition completion message to the driving unit 203.

Thereafter, when the speech recognition for a final audio file of the N-number of the test speech signals $X(N)$ is completed by repeating the above-described operations, in step S319, the driving unit 203 informs the performance evaluation module 213 of the speech evaluation end, and transmits the list of the correct recognition results of the test speech signals $X(1), X(2), \ldots, X(N)$.

In step S321, the speech recognition unit 209 provides a list of the speech recognition results stored in the storage unit 211 to the speech-recognition evaluation unit 215 in the performance evaluation module 213. The list of the speech recognition results may be either one that is produced by using the duration information $D(k)$ or the EPD function as a speech detection method.

After that, in step S323, the speech-recognition evaluation unit 215 compares the speech recognition results with the correct answers to calculate the accuracy of the speech recognition performed in the speech recognizer 207 using either the duration information or the EPD function as a speech detection method.

On the other hand, if there is a need to evaluate the performance of the speech detection, in step S325, the speech-detection evaluation unit 217 receives the detected speech sections $Z(1), Z(2), \ldots, Z(N)$ stored in the storage unit 211. Then, in step S327, the speech-detection evaluation unit 217 also receives the test speech signals $X(1), X(2), \ldots, X(N)$ for evaluation.

Thereafter, in step S329, the speech-detection evaluation unit 217 obtains the maximum value of cross-correlation coefficients $R(\tau)$ between the test speech signal $X(k)$ and the speech section $Z(k)$. The maximum value of cross-correlation coefficients $R(\tau)$ is then compared with a preset threshold to calculate the performance of the speech detection. For example, if the maximum value of the cross-correlation coefficients $R(\tau)$ for the $k_{th}$ test speech signal $X(k)$ is higher than the preset threshold, it is counted as a correct speech detection.

As described above, according to the present invention, the pre-recorded speech file is reproduced in any noise environments where the speech recognizer is located, by controlling the speaker and the microphone. Therefore, there is no need for a person to directly utter or record the test speech signals under each noise environment for evaluation. Furthermore, it is possible to freely control the volume of the uttered speech through the control of the speaker, thereby achieving an automatic evaluation of the performance of the speech recognition, without human intervention, in any noise environments.

While the invention has been shown and described with respect to the preferred embodiments, it will be understood by those skilled in the art that various changes and modifications may be made without departing from the scope of the invention as defined in the following claims.

What is claimed is:

1. An apparatus for evaluating the performance of speech recognition comprising:
   a speech database configured to store a plurality of audio signal files corresponding to test speech signals;
   a driving unit configured to reproduce through a loud speaker the respective audio signal files of the test speech signals, the driving unit having the correct recognition results of the test speeches;
   a speech recognizer configured to execute a speech recognition of the reproduced audio signals in an actual environment where the speech recognizer is located to produce speech recognition results; and
   a performance evaluation module configured to evaluate the performance of the speech recognition by comparing the correct recognition results with the speech recognition results, wherein the performance evaluation module comprises:
      a speech-recognition evaluation unit configured to compare the correct recognition results of the test speeches and the speech recognition results and to produce a result corresponding to the accuracy of the speech recognition, and
      a speech-detection evaluation unit configured to obtain a plurality of cross-correlation coefficients between the test speech signals and respective speech sections, and to compare a maximum value of the cross-correlation coefficients with a predetermined threshold to calculate the performance of the speech detection.

2. The apparatus of claim 1, wherein the speech recognizer comprises:
   a speech recognition unit configured to detect speech sections of the reproduced audio signals and performing the speech recognition on the detected speech sections; and
   a storage unit configured to store the speech recognition results and the detected speech sections of the reproduced audio signals.

3. The apparatus of claim 2, wherein each test speech signal has duration information, and
   wherein the speech recognition unit uses the duration information of the respective test speech signals to detect the speech section corresponding to the duration information.

4. The apparatus of claim 2, wherein the speech recognition unit uses an end-point detection function to detect the speech sections of the reproduced audio signals.

5. The apparatus of claim 4, wherein the cross-correlation coefficient, $R(\tau)$, is calculated by $$R(\tau) = \frac{1}{L}\sum_{i=1}^{L} x_i z_{i+\tau}, \text{ where } L = \min\{T1, T2\} - \tau$$

wherein $x_i$ is an ith sample of the test speech signal $X(k)$, $z_i$ is an ith sample of the detected speech section $Z(k)$, T1 is the number of samples in $X(k)$, T2 is the number of samples in $Z(k)$, and $\tau$ represents a lag value.

6. A method for evaluating the performance of speech recognition, comprising:
   storing a plurality of audio signal files corresponding to test speech signals in a speech database;
   reproducing the respective audio signal files of the test speech signals by a loud speaker;
   performing the speech recognition of the respective reproduced audio signals to produce speech recognition results; and
   evaluating the performance of the speech recognition by comparing correct recognition results of the test speech signals with the speech recognition results;
   detecting a speech section of the reproduced audio signal;
   obtaining cross-correlation coefficients between the test speech signals and respective speech sections; and
   comparing a maximum value of the cross-correlation coefficients with a predetermined threshold to calculate the performance of the speech detection.

7. The method of claim 6, wherein the speech section is detected by using duration information of the test speech signal.

8. The apparatus of claim 6, wherein the speech section is detected by using an end-point detection function.

9. The method of claim 6, wherein the cross-correlation coefficient, $R(\tau)$, is calculated by $$R(\tau) = \frac{1}{L}\sum_{i=1}^{L} x_i z_{i+\tau}, \text{ where } L = \min\{T1, T2\} - \tau$$

wherein xi is an ith sample of the test speech signal $X(k)$; zi is an ith sample of the detected speech section $Z(k)$; T1 is the number of samples in $X(k)$; T2 is the number of samples in $Z(k)$; and $\tau$ represents a lag value.

* * * * *